United States Patent
Mao et al.

(10) Patent No.: US 9,537,390 B2
(45) Date of Patent: Jan. 3, 2017

(54) CONTROL CIRCUIT, CONTROL METHOD, DC-DC CONVERTER AND ELECTRONIC DEVICE

(75) Inventors: Jingwen Mao, Beijing (CN); Zhiyong Luo, Beijing (CN); Kaihua Zheng, Beijing (CN)

(73) Assignee: OPTIS CIRCUIT TECHNOLOGY, LLC, Plano, TX (US)

( * ) Notice: Subject to any disclaimer, the term of this patent is extended or adjusted under 35 U.S.C. 154(b) by 38 days.

(21) Appl. No.: 14/378,751

(22) PCT Filed: Mar. 7, 2012

(86) PCT No.: PCT/CN2012/072064
§ 371 (c)(1),
(2), (4) Date: Aug. 15, 2014

(87) PCT Pub. No.: WO2013/131259
PCT Pub. Date: Sep. 12, 2013

(65) Prior Publication Data
US 2015/0028825 A1    Jan. 29, 2015

(51) Int. Cl.
*H02J 3/12*      (2006.01)
*G05F 1/00*     (2006.01)
(Continued)

(52) U.S. Cl.
CPC .............. *H02M 3/04* (2013.01); *H02M 1/08* (2013.01); *H02M 3/157* (2013.01);
(Continued)

(58) Field of Classification Search
CPC ............ H02M 2001/0032; H02M 2001/0035; H02M 3/145; H02M 3/155; H02M 3/156; G05F 1/56; G05F 1/563; G05F 1/565; G05F 1/569; G05F 1/575; G05F 1/59; G05F 1/595; G05F 1/62
(Continued)

(56) References Cited

U.S. PATENT DOCUMENTS

| 7,652,459 B2 * | 1/2010 | Abu Qahouq ........ H02M 3/157 323/283 |
| 2006/0044845 A1 * | 3/2006 | Fahlenkamp et al. ..... 363/21.15 |

(Continued)

FOREIGN PATENT DOCUMENTS

| CN | 101252311 A | 8/2008 |
| CN | 101283325 A | 10/2008 |
| CN | 102104334 A | 6/2011 |

OTHER PUBLICATIONS

International Search Report issued in corresponding International application No. PCT/CN2012/072064, date of mailing Dec. 27, 2012.

(Continued)

*Primary Examiner* — Adolf Berhane
*Assistant Examiner* — Gary Nash
(74) *Attorney, Agent, or Firm* — The Danamraj Law Group, P.C.; Thomas L. Crisman; Kenneth A. McClure

(57) ABSTRACT

A control circuit (115), a control method, a DC-DC converter and an electronic device are provided. The control circuit (115) is used to control the DC-DC converter to switch its operation modes. In the control circuit (115), whether mode of the DC-DC converter is to be switched is judged according to parameters of a first duration of an active duration and a second duration of an inactive duration. Comparison of analog values is prevented, and as a result, the use of the analog comparator is reduced, thus the influence of the semiconductor processes on designing a controller can be reduced.

14 Claims, 6 Drawing Sheets

(51) Int. Cl.
*H02M 3/04* (2006.01)
*H02M 3/157* (2006.01)
*H02M 1/08* (2006.01)
H02M 3/158 (2006.01)
H02M 1/00 (2006.01)

(52) U.S. Cl.
CPC .. *H02M 3/1588* (2013.01); *H02M 2001/0003* (2013.01); *Y02B 70/1466* (2013.01)

(58) Field of Classification Search
USPC ........ 323/241–243, 246, 266, 274–277, 279, 323/280, 282–286
See application file for complete search history.

(56) References Cited

U.S. PATENT DOCUMENTS

| | | | |
|---|---|---|---|
| 2008/0205103 A1 | 8/2008 | Sutardja et al. | |
| 2010/0148737 A1* | 6/2010 | Li ....................... | H02M 3/1588 323/282 |
| 2010/0201336 A1* | 8/2010 | Chen ................... | H02M 3/1588 323/285 |
| 2010/0264891 A1* | 10/2010 | Lee ...................... | H02M 3/158 323/282 |
| 2011/0267024 A1* | 11/2011 | Halberstadt ................... | 323/304 |

OTHER PUBLICATIONS

Written Opinion of the International Searching Authority issued in corresponding International application No. PCT/CN2012/072064, date of mailing Dec. 27, 2012.

\* cited by examiner

CONTROL CIRCUIT, CONTROL METHOD, DC-DC CONVERTER AND ELECTRONIC DEVICE

TECHNICAL FIELD

The present invention relates to DC-DC power switching field, in particular to a DC-DC converter, a mode switching control method, and an electronic device, so as to increase reliability of the DC-DC converter during switching process of operation modes.

BACKGROUND

DC-DC converter, as a device for realizing conversion of different DC voltages using a switching technique, is widely used in consumer electronics and industry electronics, and can increase power efficiency of a battery effectively. Therefore, conversion efficiency is a key parameter to measure performance of the DC-DC converter. In addition, when the DC-DC converter is desired to output a lower voltage, e.g., when it is used for supplying power to a memory, ripple of the output voltage is also a very important performance parameter.

Generally speaking, in order to acquire high conversion efficiency, different control methods are adopted for a heavy load and a light load, respectively. At the heavy load, the DC-DC converter usually operates in a continuous mode, while at the light load, the DC-DC converter usually operates in a discontinuous mode. These two modes correspond to two non-overlapping load regions. If the load regions overlap with each other, the two modes will be switched frequently in the case of a certain load, so as to output a larger ripple. As a result, it is required to design an effective mode switching method, so as to ensure that the load regions of the two modes do not overlap with each other, thereby to decrease the ripples of the output voltage.

As shown in FIG. 1, a DC-DC converter includes a first switch 102, a second switch 103, an inductor 104, a capacitor 105 and a controller 107.

A power source 101 is connected to the ground via the first switch 102 and the second switch 103 that are connected in sequence.

The inductor 104 and the capacitor 105 that are connected in sequence have one end connected between the first switch 102 and the second switch 103 and the other end connected to the ground.

A load 106 has one end connected between the inductor 104 and the capacitor 105 and the other end connected to the ground.

The controller 107 controls the first switch 102 and the second switch 103 so as to enable the converter to operate in different modes when the load 106 is in a light load state or in a heavy load state, thereby to increase the power conversion efficiency.

At the discontinuous mode, the DC-DC converter has two durations, i.e., active duration and inactive duration. At the active duration, the capacitor 105 can be charged continuously by controlling the first switch 102 and the second switch 103 until an output voltage Vout reaches a first predetermined threshold, and then the converter enters the inactive duration. in the inactive duration, the capacitor 105 is discharged until the output voltage Vow decreases to a second predetermined threshold (which is less than the first predetermined threshold), and then the converter enters the active duration.

The above-mentioned processes are repeated until the DC-DC converter is desired to be switched to the continuous mode.

During the switching process of the operation modes, the controller 107 shall ensure that the operation modes of the DC-DC converter will not be switched frequently in the case of a constant load.

In the prior art, when the DC-DC converter operates in the discontinuous mode, the output voltage will decrease if the load is greater than the load region corresponding to the discontinuous mode. The controller 107 compares the output voltage Vout with a reference voltage Vref. When Vout<Vref−Δ, it is judged that it needs to execute mode switching control so that the DC-DC converter is switched from the discontinuous mode to the continuous mode, Δ is a voltage used to add hysteresis to the switching from the discontinuous mode to the continuous mode, in order to prevent frequent mode switching in the case of a constant load.

It can be found from the above description that, in an existing algorithm for mode switching control from the discontinuous mode to the continuous mode, it needs a hysteresis value Δ. This value may not be too small. The output voltage will also decrease by Δ1 when the load within the load region corresponding to the discontinuous mode, thus Δ shall be greater than Δ1. This value may not be too big either, otherwise large ripples will occur when switching. In an analogue process, the value of Δ may be variable in a large range along with the change of process corner, temperature and power voltage, thus it is difficult to ensure the reliability of mode switching. In addition, in the prior art, an analogue comparator is required so as to compare two analogue values, i.e., Vout and Vref. However, the analogue comparator is constrained by semiconductor processes. For example, when the process changes from 130 nm to 40 nm, the analogue comparator needs to be redesigned, and thus the design time will be delayed.

SUMMARY

Embodiments of the present invention disclose a control circuit, a control method, a DC-DC converter and an electronic device. According to several embodiments disclosed herein, the present invention can increase reliability of the converter during operation mode switching.

According to the embodiments of the present invention, is judged whether modes of the DC-DC converter need to be switched according to a parameter of an operation duration time in an active duration and an operation duration time in an inactive duration, so as to reduce the use of an analogue comparator, thereby to reduce the influence of semiconductor processes on designing a controller.

According to the embodiments of the present invention, when judging whether the modes of the DC-DC converter need to be switched, the control circuit performs judgment according to Na and Ns.

According to the embodiments of the present invention, if $\beta \cdot Na/(Na+Ns)$ is greater than or equal to $\gamma$, the DC-DC converter is switched from the discontinuous mode to the continuous mode, so as to prevent frequent switching of the DC-DC converter between the discontinuous mode and the continuous mode in the case of a constant load. Na is a number of clock periods of the active duration and Ns is a number of clock periods of the inactive duration.

According to the embodiment of the present invention, when judging whether the modes of the DC-DC converter need to be switched, the DC-DC converter is controlled to be switched from the discontinuous mode to the continuous mode if β·Na/(Na+Ns) is greater than or equal to γ. Therefore, different thresholds γ may be set according to requirements so that the DC-DC converter can be adapted to different application scenarios.

Of course, the present invention is not limited to the above-mentioned features and advantages. Actually, a person skilled in the art will understand the other features and advantages by reading the following embodiments in conjunction with the accompanying drawings.

DETAILED DESCRIPTION

In a control circuit, a control method, a DC-DC converter and an electronic device according to embodiments of the present invention, whether modes of the DC-DC converter are to be switched is judged according to durations of an active duration and an inactive duration. Therefore, the use of an analogue comparator is reduced, thus the influence of semiconductor processes on designing a controller is reduced.

Figure 2:
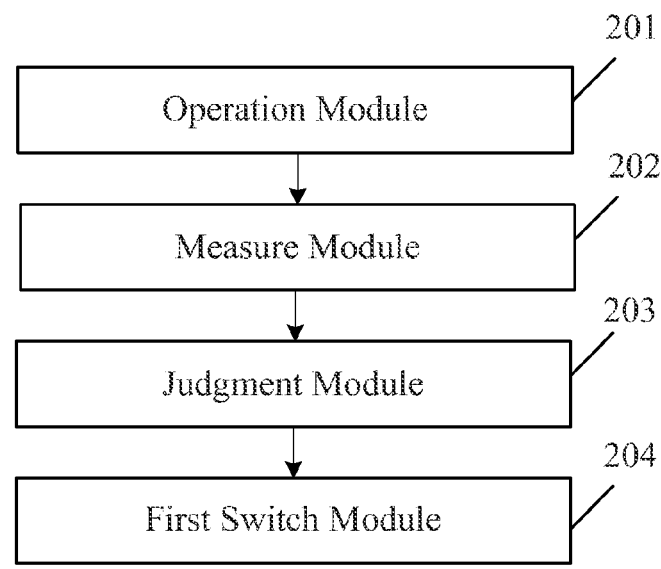
FIG. 2 is a block diagram of a control circuit, the operation modes of which needs to be switched, according to embodiments of the present invention.

The Control circuit according to embodiments of the present invention is used for controlling the DC-DC converter to switch operation modes. The operation modes include a continuous mode and a discontinuous mode. The discontinuous mode comprising an active duration and an inactive duration. As shown in FIG. 2, the control circuit includes:

an operation module 201 operates the DC-DC converter in the discontinuous mode;

a measure module 202 measures a first duration of an active duration and a second duration of an inactive duration;

a judgment module 203 judges whether a predefined criterion is satisfied according to the first duration and the second duration;

a first switch module 204 switches the DC-DC converter to operate in the continuous mode if the predefined criterion is satisfied.

In the control circuit according to the embodiments of the present invention, whether modes of the DC-DC converter is to be switched is judged according to parameters of a first duration of an active duration and a second duration of an inactive duration. This prevents comparison of analogue values, and as a result, the use of the analogue comparator is reduced, thus the influence of the semiconductor processes on designing the controller can be reduced.

The control circuit according to the embodiments of the present invention needs not only to control the DC-DC converter to be switched from the discontinuous mode to the continuous mode, but also to control the DC-DC converter to be switched from the continuous mode to the discontinuous mode when the DC-DC converter operates in the continuous mode if a switching condition comes into establishment.

Generally, the switching condition for switching the modes from the continuous mode to the discontinuous mode is that the inductance current is zero crossing. Therefore, the Control circuit further includes:

a second switch module, when the DC-DC converter operates in the continuous mode and a first current flowing through an inductor is less than or equal to 0 (i.e., the inductance current is zero crossing), switches the DC-DC converter to operate in the discontinuous mode.

In embodiments of the present invention, various methods may be used to judge that the inductance current is zero crossing, and one of them is described hereinafter.

Figure 1:
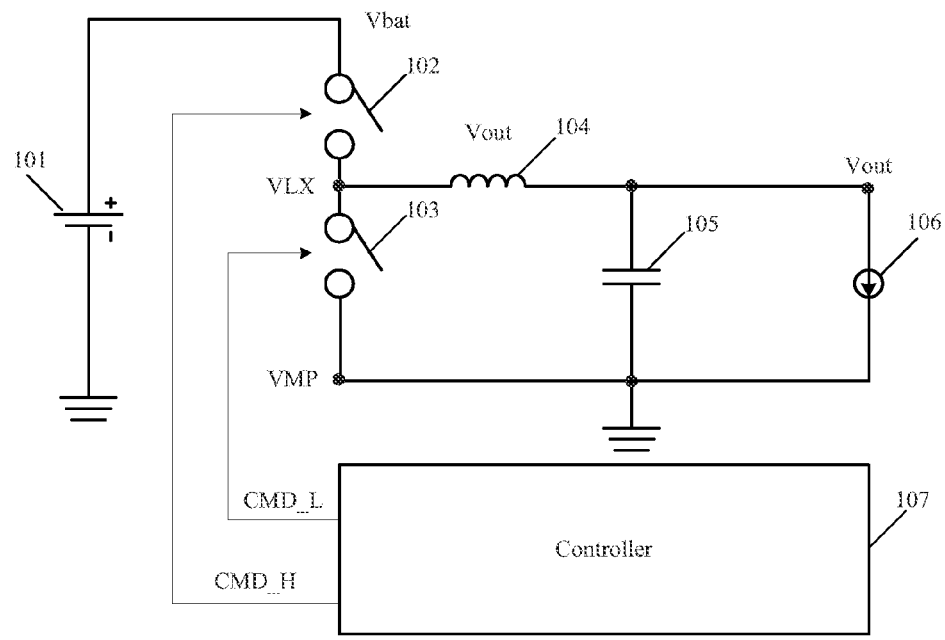
FIG. 1 is a block diagram of an existing DC-DC converter.

As shown in FIG. 1, the DC-DC converter has two points VLX and VMP (two end points of a second switch), wherein VLX is located between a first switch 102 and a second switch 103, and VMP is located at a ground terminal of the second switch 103.

When the second switch 103 is turned on, due to parasitic resistance in the second switch 103, the voltage difference between VLX and VMP is greater than 0 when the direction of the current is changed (i.e., the inductance current is zero crossing).

Therefore, in embodiments of the present invention, a comparator is used to compare a voltage at VLX and a voltage at VMP, and then output a comparison result.

When the current flowing through the second switch changes the inductance current is zero crossing), the voltage difference between VLX and VMP is greater than 0. At this time, the control circuit may judge whether the inductance current is zero crossing according to an output ZCD of the comparator, and output a control signal to control the DC-DC converter to be switched from the continuous mode to the discontinuous mode when it is judged according to ZCD that the inductance current is zero crossing.

In embodiments of the present invention, a first duration of an active duration and a second duration of an inactive duration are a first number of clock periods and a second number of clock periods counted using a same clock signal, and the measure module 202 may be a counter. When the DC-DC converter is switched from the active duration to the inactive duration or from the inactive duration to the active duration, the counter resets and starts to count to obtain a counting result, and transmits the counting result to the judgment module 203 for judging whether the predefined criterion is satisfied.

Generally, in order to prevent frequent mode switching in the case of a constant load, the mode switching control is performed to switch the DC-DC converter from the discontinuous mode to the continuous mode when Vout<Vref−Δ. In embodiments of the present invention, frequent mode switching can also be prevented in the case of a constant load. Detailed description is given as follows.

In embodiments of the present invention, the judgment module is used to judge whether the predefined criterion is satisfied.

In embodiments of the present invention, the defined criterion can be Ta/(Ta+Ts) being greater than or equal to a first constant, wherein Ta is the first duration, Ts is the second duration.

Ta can be counted with a clock during active duration to get a number Na, and Ts can be counted with the same clock during inactive duration to get a number Ns. And the predefined criterion Ta/(Ta+Ts) being greater than or equal to a first constant can be transformed to be Na/(Na+Ns) being greater than or equal to the first constant.

When the DC-DC converter is working in active duration, switches 102 and 103 are switched on and off alternatively. If the predefined clock period for counting is the same as switching period of switches 102 and 103 during active mode, Na is the same as switching cycles.

To prevent frequent mode switching in the case of a constant load, the predefined criterion can be β·Na/(Na+Ns) is greater than or equal to γ, wherein γ is a constant greater than 1, β is a quotient of a first switching frequency of the DC-DC converter operating in the continuous mode and a second switching frequency of the DC-DC converter operating in the discontinuous mode.

Through the above-mentioned control, it is able to prevent frequent operation mode switching of the DC-DC converter in the case of a constant load. Detailed description is given as follows.

At first, the explanations on the parameters are as follows.

When the DC-DC converter operates in continuous mode, a switching frequency of the first switch and the second switch is a first frequency $F_{CM}$, while when the DC-DC converter operates in the active duration of discontinuous mode, a switching frequency of the first switch and the second switch is a second frequency $F_{DM}$. The switching frequency will decrease when the DC-DC converter is switched from the continuous mode to the discontinuous mode. Presumed that $\beta = F_{CM}/F_{DM}$, then β is a constant greater than 1.

The switching condition for switching the DC-DC converter from the continuous mode to the discontinuous mode is that the inductance current is zero crossing. Presumed that a current threshold of a load current when the DC-DC converter is switched from the continuous mode to the discontinuous mode is $I_{CM-DM}$, according to the circuit as shown in FIG. 1, it can be known that:

$$I_{CM-DM} = \frac{1}{2F_{CM}} \cdot \frac{Vbat - Vout}{L} \cdot \frac{Vout}{Vbat}$$

wherein, L is an inductance of the inductor 104.

When the DC-DC converter is switched to the discontinuous mode, it operates alternately between the active duration and the inactive duration.

As shown in FIG. 1, in the active duration, the capacitor 105 is charged, and at this time the electric quantity charged with the capacitor 105 is that:

$$(\beta \cdot I_{CM-DM} - Iload) \cdot Na \cdot Tsw$$

wherein, Tsw is a clock period, and Iload is a load current in the discontinuous mode.

In the inactive duration, the load is discharged by the capacitor 105, and at this time the electric quantity discharged by the capacitor is that:

$$Iload \cdot Ns \cdot Tsw.$$

According to conversation of charge, it can be known that:

$$(\beta \cdot I_{CM-DM} - Iload) \cdot Na \cdot Tsw = Iload \cdot Ns \cdot Tsw,$$

and thus $$Iload = \frac{\beta \cdot Na}{Na + Ns} \cdot I_{CM-DM}$$

Namely, the current threshold of the load current when the DC-DC converter is switched from the discontinuous mode to the continuous mode is $I_{DM-CM}$, wherein $$I_{DM-CM} = \frac{\beta \cdot Na}{Na + Ns} \cdot I_{CM-DM}$$

In order to prevent frequent mode switching in the case of a constant load, it needs to ensure that $$I_{DM-CM} > I_{CM-DM}$$

In other words, when the following equation establishes, it is able to prevent frequent mode switching in the case of a constant load:

$$\frac{\beta \cdot Na}{Na + Ns} \cdot I_{CM-DM} > I_{CM-DM},$$

i.e., $$\frac{\beta \cdot Na}{Na + Ns} > 1$$

Of course, the condition that β·Na/(Na+Ns) is greater than 1 is a basic one. Frequent mode switching in the case of a constant load may be prevented when β·Na/(Na+Ns) is greater than or equal to γ (γ is greater than 1).

For example, presumed that β is 2, and it needs to switch the mode from the discontinuous mode to the continuous mode when $I_{PSM-CCM}$ is 4/3 times $I_{CM-DM}$, then $$\frac{2 \cdot Na}{Na + Ns} \cdot I_{CM-DM} = 4I_{CM-DM}/3,$$

i.e., $$Na = 2Ns$$

Therefore, when the control circuit judges that Na is greater than or equal to 2Ns, it may be judged that predefined criterion is satisfied and the first switch module will switch the DC-DC converter to operate in the continuous mode.

It can be found from the above-mentioned description that, in the case that β is determined, the judgment of whether the predefined criterion is satisfied according to the embodiment of the present invention is merely related to Na and Ns. As a result, it is unnecessary to provide in the control circuit an analogue comparator for judging, the voltage values, and the influence of the semiconductor processes on designing the control circuit will be reduced greatly.

Meanwhile, in embodiments of the present invention, it is able to control the current thresholds by comparing Na and Ns such that $I_{PSM-CCM} > I_{CCM-PSM}$, thus frequent mode switching in the case of a constant load can be prevented.

In embodiments of the present invention, when the DC-DC converter operates in the continuous mode, it shall ensure as possible that the output voltage maintains stable. Therefore, the control circuit according to the embodiments of the present invention further includes:

a control module, when the DC-DC converter operates in the continuous mode, controls the DC-DC converter according to the output voltage of the DC-DC converter such that the output voltage of the DC-DC converter maintains stable.

How the third control module controls the DC-DC converter according to the output voltage of the DC-DC converter will be described subsequently.

A DC-DC converter is also disclosed in the embodiments of the present invention, which includes an input node, an output node, and a first switch, a second switch, an inductor, a capacitor, a control circuit connected between the input node and the output node.

The first switch and the second switch are connected in sequence. The end of the first switch not connected to the second switch is connected to the input node, and the end of the second switch not connected to the first switch is connected to the ground.

The operation modes of the DC-DC converter include a continuous mode and a discontinuous mode. The discontinuous mode comprises an active duration and inactive duration. As shown in FIG. 2, the control circuit includes:

an operation module 201 operates the DC-DC converter in the discontinuous mode;

a measure module 202 measures a first duration of an active duration and a second duration of an inactive duration;

a judgment module 203 judges whether a predefined criterion is satisfied according to the first duration and the second duration;

a first switch module 204 switches the DC-DC converter to operate in the continuous mode if the predefined criterion is satisfied.

In another words, the control circuit is configured to:

switch the DC-DC converter between the continuous mode and the discontinuous mode;

switch the DC-DC converter between an active duration and inactive duration of the discontinuous mode;

measure a first duration of the active duration and a second duration of the inactive duration;

judge whether a predefined criterion is satisfied according to the first duration and the second duration;

if the predefined criterion is satisfied, switch the DC-DC converter from the discontinuous mode to the continuous mode.

The DC-DC converter according to embodiments of the present invention further includes a second switch module.

When the DC-DC converter operates in the continuous mode, the second switch module switches the DC-DC converter to operate in the discontinuous mode if a first current flowing through the inductor is less than or equal to 0.

Here, when the direction of the inductance current changes, as shown in FIG. 1, the voltage difference between two ends VLX and VMP of the second switch is greater than 0. Therefore, in embodiments of the present invention, whether the first current flowing through the inductor is less than or equal to 0 may be judged by comparing the voltages at the two ends of the second switch, thus the second control module may judge whether the first current is less than or equal to 0 according to the comparison result of the voltages at the two ends of the second switch.

In embodiments of the present invention, the first duration of the active duration and the second duration of the inactive duration are a first number of clock periods and a second number of clock periods counted using a same clock signal.

In embodiments of the present invention, the predefined criterion can be Na/(Na+Ns) being greater than or equal to a first constant, wherein Na is a number of clock periods of the active duration and Ns is a number of clock periods of the inactive duration.

To prevent frequent mode switching in the case of a constant load, the predefined criterion may be $\beta \cdot Na/(Na+Ns)$ being greater than or equal to $\gamma$, wherein $\gamma$ is a constant greater than 1, $\beta$ is a quotient of a first switching frequency of the DC-DC converter operating in the continuous mode and a second switching frequency of the DC-DC converter operating in the discontinuous mode.

Meanwhile, the DC-DC converter according to the embodiment of the present invention further includes a control module, when the DC-DC converter operates in the continuous mode, the control module controls the first switch and the second switch such that the voltage of the output node of the DC-DC converter maintains stable.

Figure 3:
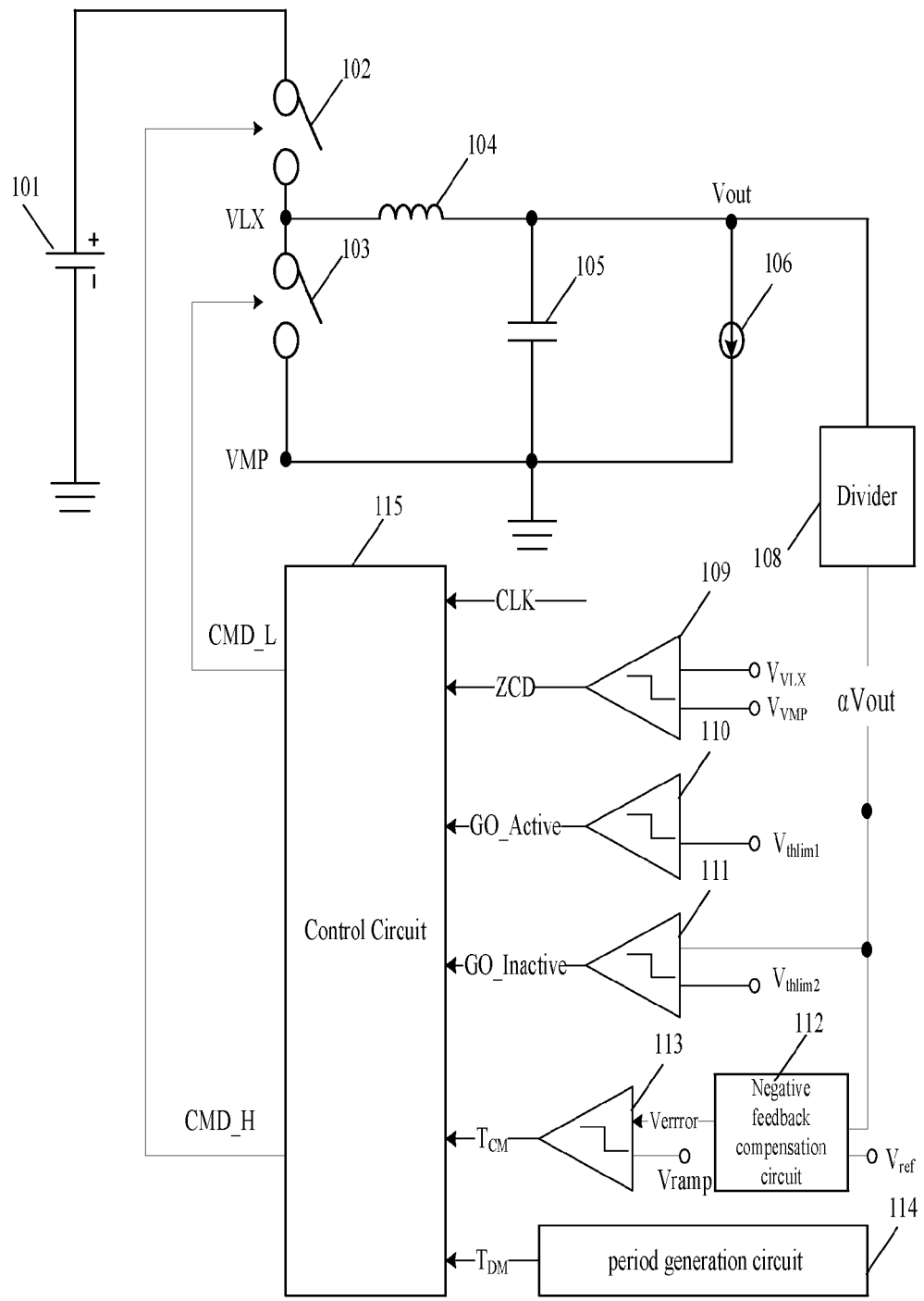
FIG. 3 is a block diagram showing an implementation way for the DC-DC converter according to embodiments of the present invention.
Figure 4:
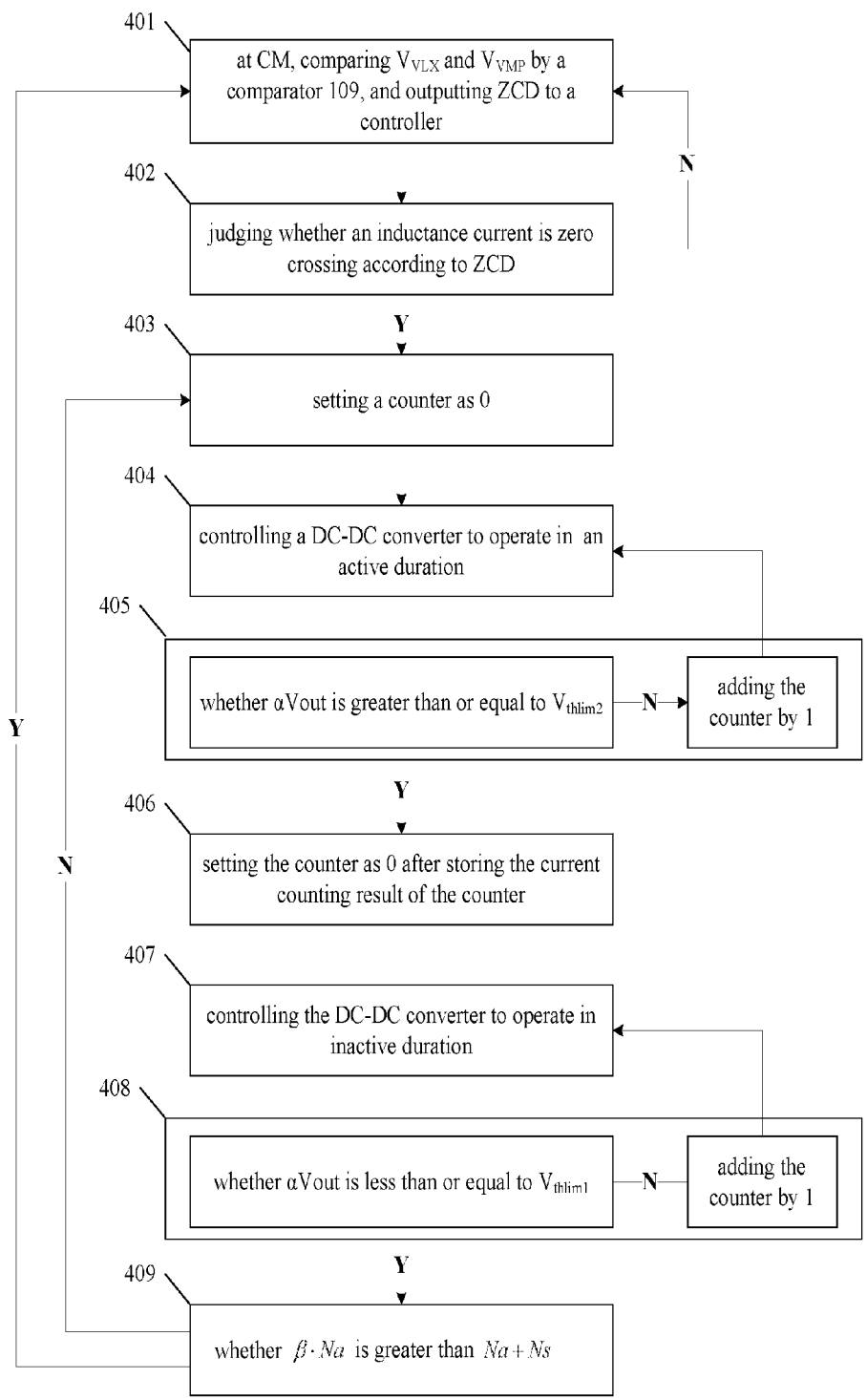
FIG. 4 is a flow chart of an operation process of the DC-DC converter as shown in FIG. 3.

FIG. 3 is a block diagram showing an implementation way for the DC-DC converter according to embodiments of the present invention, and FIG. 4 is a flow chart of an operation process of the DC-DC converter as shown in FIG. 3. Detailed description is given hereinafter to the switching process by combining FIG. 3 and FIG. 4.

As shown in FIGS. 3, 4, 5 and 6, the operation process of the DC-DC converter includes the following steps.

Step 401: when the DC-DC converter operates in the continuous mode, a comparator 109 compares $V_{VLX}$ and $V_{VMP}$, and outputs a ZCD signal to a control circuit 115.

Step 402: the control circuit judges whether an inductance current zero crossing according to the ZCD signal; if yes, it turns to Step 403; and otherwise it returns to Step 401.

Figure 5:
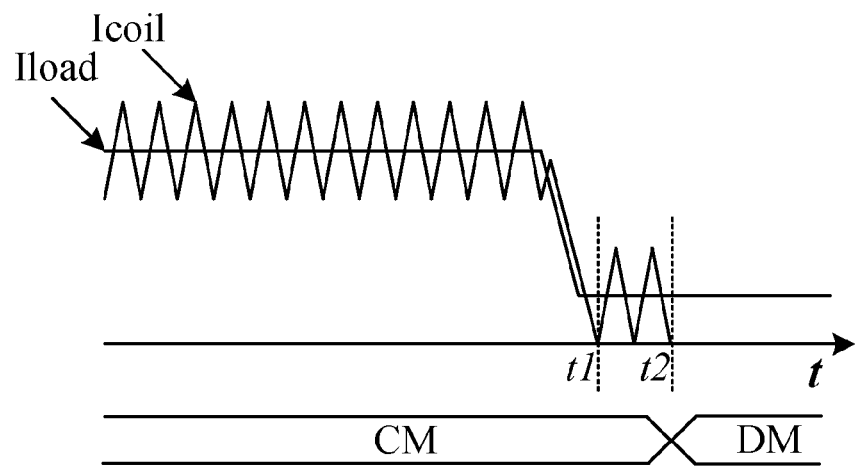
FIG. 5 is a schematic diagram showing the changing situations of a load current and an inductance current of the DC-DC converter during the switching process from the continuous mode to the discontinuous mode.

As shown in FIG. 5, when the DC-DC converter operates in continuous mode, an inductance current Icoil before t1 is greater than 0, and between t1 and t2, Icoil is zero crossing for three times. At this time, the ZCD signal will change, thus it can be judged that the inductance current is zero crossing.

Step 403: a counter is set as 0.

Step 404: the control circuit 115 switches the DC-DC converter to operate in the active duration by controlling the first switch 102 and the second switch 103.

Step 405: in the active duration, the control circuit 115 judges whether $\alpha$ Vout is greater than or equal to $V_{thlim1}$ in each clock period. When $\alpha$ Vout is greater than or equal to $V_{thlim2}$, it turns to Step 406, and otherwise it returns to Step 404 after the counter is added by 1.

As shown in FIG. 3, the DC-DC converter further comprising:

a divider 108 connected to the output node for multiplying an output voltage Vout of the DC-DC converter by a factor alpha where alpha is less than or equal to one, and obtaining a first voltage;

a first comparator 110 having a first input for receiving the first voltage, a second input for receiving a first threshold $V_{thlim1}$ and an output for outputting a first control signal Go_Active to the control circuit 115 based on the comparison of the first voltage and the first threshold;

a second comparator 110 having a first input for receiving the first voltage, a second input for receiving a second threshold $V_{thlim2}$ and an output for outputting a second control signal Go_Inactive to the control circuit 115 based on the comparison of the first voltage and the second threshold;

wherein, the control circuit 115 is further configured to:

switch the DC-DC converter to a next active duration if the first voltage is greater than or equal to the first threshold; and switch the DC-DC converter to a next inactive duration if the first voltage is less than or equal to the second threshold.

As shown in FIG. 3, in Step 405, the comparator 111 compares a first voltage threshold $V_{thlim2}$ and an output α Vout of a divider 108, and outputs a signal GO_Inactive. When α Vout is less than $V_{thlim2}$, GO_Inactive is 0, and when α Vout is greater than or equal to $V_{thlim2}$, GO_Inactive is 1.

When GO_Inactive is 0, the counter is added by 1 and the judgment is repeated in the next clock period. When GO_inactive is 1, it means that it needs to be switched to the inactive duration, and at this time the DC-DC converter enters the inactive duration.

Step 406: the control circuit 115 sets the counter as 0 after storing the current counting result of the counter.

Step 407: the control circuit 115 controls the DC-DC converter to operate in the inactive duration by controlling the first switch 102 and the second switch 103.

Step 408: in the inactive duration, the control circuit 115 judges whether α Vout is less than or equal to $V_{thlim1}$ in each clock period. When α Vout is less than or equal to $V_{thlim1}$, it turns to Step 409, and otherwise it returns to Step 407 after the counter is added by 1.

As shown in FIG. 3, in Step 408, the comparator 110 compares the first voltage threshold $V_{thlim1}$ (which is less than $V_{thlim2}$) and the output α Vout of the divider 108 in each clock period, and outputs a signal GO_Active. When α Vout is greater than $V_{thlim1}$, GO_Active is 0, and when α Vout is less than or equal to $V_{thlim1}$, GO_Active is 1.

When GO_Active is 0, it means that the inactive duration will be maintained, the counter is added by 1 and the judgment is repeated in the next clock period. When GO_Active is 1, it means that it needs to be switched to the active duration, and at this time the DC-DC converter enters the active duration.

Step 409: it is judged whether β·Na is greater than Na+Ns. If yes, it returns to Step 401, and otherwise it returns to Step 403.

Of course, in the above-mentioned embodiments, the description is given based on that $V_{thlim1}$ is less than $V_{thlim2}$, thus the DC-DC converter as shown in FIG. 3 includes two comparators 110 and 111. When $V_{thlim1}$ is equal to $V_{thlim2}$, only one comparator is required.

Meanwhile, in the above-mentioned steps, judgment is made by taking whether β·Na is greater than Na+Ns as an example. However, it should be understood that, whether to switch modes may also be determined by judging whether β·Na is greater than γ(Na+Ns).

Figure 6:
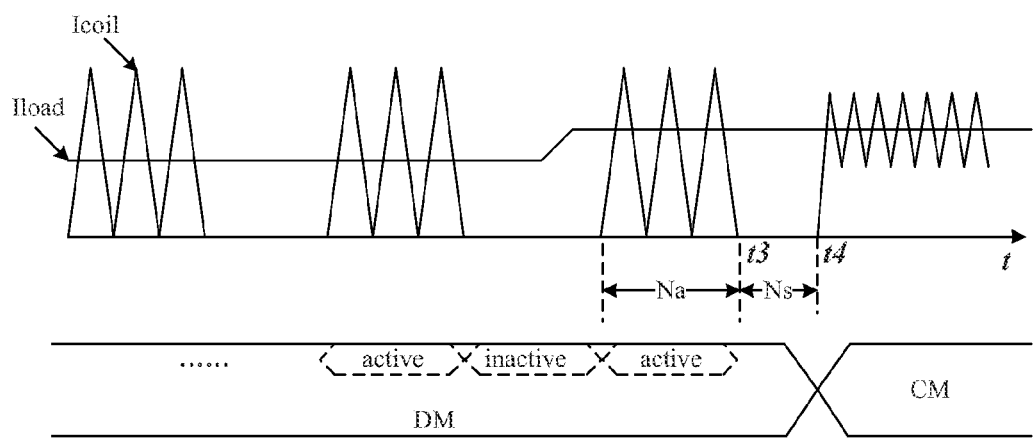
FIG. 6 is a schematic diagram showing the changing situations of load current and inductance current of the DC-DC converter during the switching process from the discontinuous mode to the continuous mode.

As shown in FIG. 6, before t3, the load current Iload becomes larger, and at this time Na remains unchanged. The duration time in the subsequent inactive duration shortens such that β·Na is greater than Na+Ns. Therefore, it needs to switch the mode to the discontinuous mode when the inactive duration is ended.

As mentioned hereinbefore, when the DC-DC converter operates in the continuous mode, the control circuit according to the embodiments of the present invention further includes a control module which controls the DC-DC converter according to the output voltage of the DC-DC converter, so that the output voltage of the DC-DC converter maintains stable.

One implementation way of the third control module is described hereinafter.

As shown in FIG. 3, α Vout is output to a negative feedback compensation network 112, which includes two RC circuits and an amplifier. The negative feedback compensation network 112 takes a differential signal of α Vout and Vref, and then provides a variable voltage signal Verror through phase shift compensation (e.g., a typical TYPEIII voltage compensation).

Then, the comparator 113 compares Verror and a ramp voltage with the same period as the continuous mode to obtain a variable duty ratio signal $T_{CM}$.

At the continuous mode, the control circuit generates CMD_L and CMD_H according to $T_{CM}$. When the output voltage increases, the duty ratio of $T_{CM}$ will decrease, so as to reduce the current flowing from Vbat to the output end and reduce the output voltage.

By combining the above description of the process, detailed description is given to the control logic inside the control circuit as follows.

Figure 7:
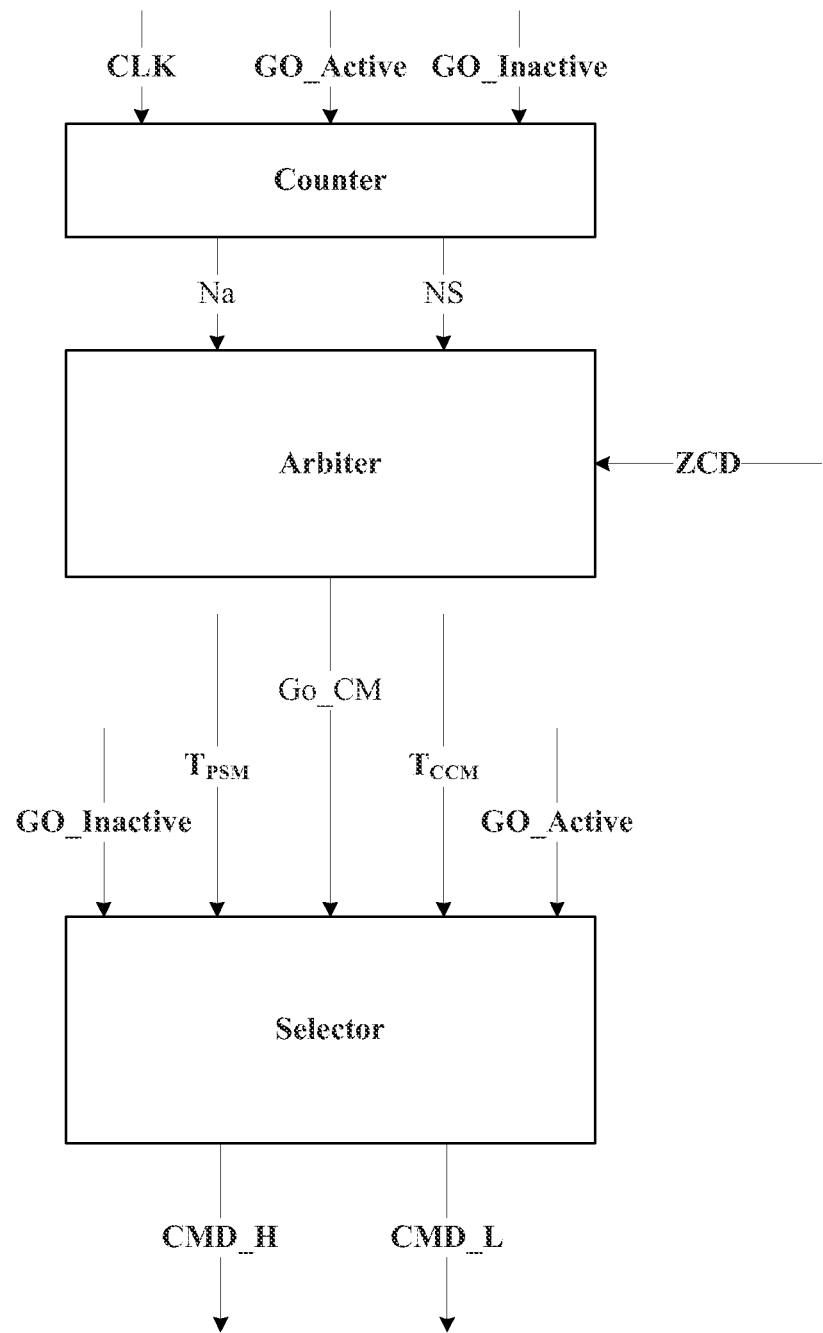
FIG. 7 is a schematic diagram showing internal signals of the control circuit and the control logic according to embodiments of the present invention.

As shown in FIGS. 3 and 7, the control logic inside the control circuit according to embodiments of the present invention is described as follows.

At first, in the continuous mode an arbiter will output a Go_CM signal according to the output ZCD signal of the comparator 109. When the ZCD signal changes from 0 to 1, the Go_CM signal changes from 1 to 0.

At the discontinuous mode, the arbiter will output a Go_CM signal according to Na and Ns. When β·Na is greater than Na+Ns, the Go_CM signal changes from 0 to 1.

When the Go_CM signal is 1, it means that the DC-DC converter needs to operate in the continuous mode (CM). At this time, a selector will select $T_{CM}$ to generate control signals CMD_H and CMD_L so as to control the first switch 102 and the second switch 103.

When the Go_CM signal is 0, it means that the DC-DC converter needs to operate in the discontinuous mode. At this time, the selector will select $T_{DM}$ (generated by a switching period generation circuit 114 in FIG. 3) to generate the control signals CMD_H and CMD_L so as to control the first switch 102 and the second switch 103. Meanwhile, the modes will also be switched between the active duration and the inactive duration according to Go_Active and Go_Inactive.

As shown in FIG. 3, switch 102 and 103 are controlled by CMD_H and CMD_L respectively. When CMD_H is high, switch 102 is ON. The DC source 101 then charges through inductor 104 to supply the load 106. When CMD_L is high, switch 103 is ON. Inductor 104 continues supply the load 106 with stored energy. To avoid the DC source 101 being short to VMP, switches 102 and 103 are not allowed to switching ON at the same time. Therefore, CMD_L and CMD_H are non-overlap signals.

An electronic device is further disclosed according to embodiments of the present invention, which includes a power source, a load and the above-mentioned DC-DC converter. The load has one end connected between the inductor and the capacitor and the other end connected to the ground.

Figure 8:
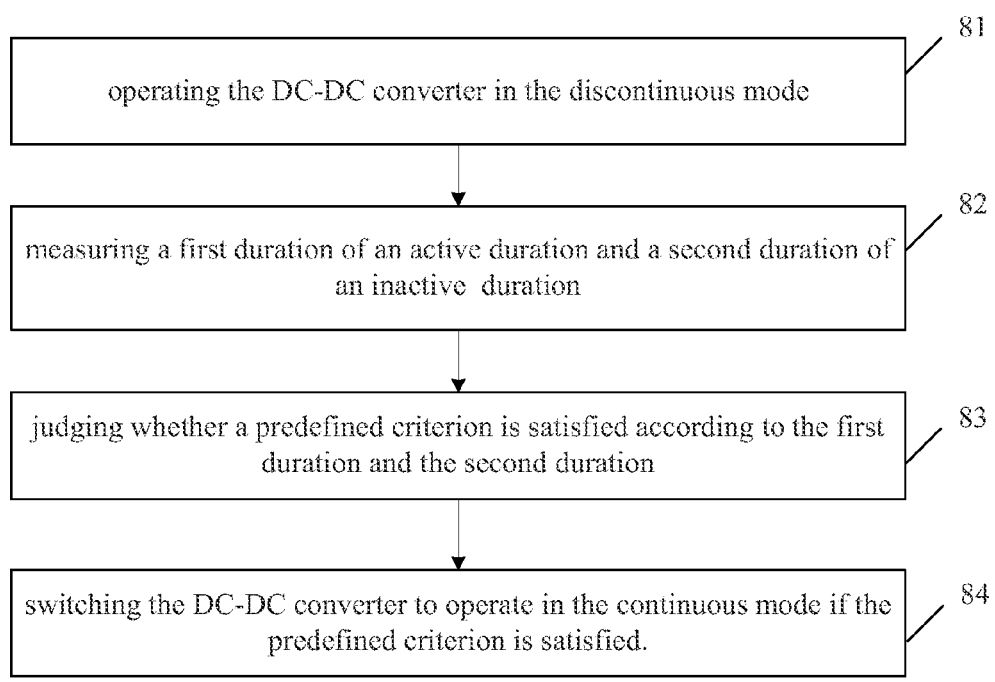
FIG. 8 is a flow chart of a control method according to embodiments of the present invention.

A control method for controlling the DC-DC converter to switch the operation modes is further disclosed according to embodiments of the present invention. The operation modes include a continuous mode and a discontinuous mode. The discontinuous mode includes an active duration and an inactive duration. As shown in FIG. 8, the control method includes:

Step 81: operating the DC-DC converter in the discontinuous mode;

Step 82: measuring a first duration of an active duration and a second duration of an inactive duration;

Step 83: judging whether a predefined criterion is satisfied according to first duration and the second duration;

Step 84: switching the DC-DC converter to operate in the continuous mode if the predefined criterion is satisfied.

The control method further includes:

acquiring a first current flowing through an inductor when the DC-DC converter operates in the continuous mode; and switching the DC-DC converter to operate at the discontinuous mode when the first current is less than or equal to 0.

To be convenient and accurate, the first duration and the second duration are a first and second number of clock periods counted using a same clock signal.

In embodiments of the present invention, during the process of judging whether a predefined criterion is satisfied, the predefined criterion is Na/(Na+Ns) being greater than or equal to first constant, wherein Na is a number of clock periods of the active duration and Ns is a number of clock periods of the inactive duration.

To prevent frequent mode switching in the case of a constant load, the predefined criterion can be $\beta \cdot Na/(Na+Ns)$ is greater than or equal to $\gamma$. When $\beta \cdot Na/(Na+Ns)$ is greater than or equal to $\gamma \cdot \gamma$ is a constant greater than 1, and $\beta$ is a quotient of a first switching frequency of the DC-DC converter operating in the continuous mode and a second switching frequency of the DC-DC converter operating in the discontinuous mode.

In embodiments of the present invention, operating the DC-DC converter in the discontinuous mode comprises:

multiplying an output voltage of the DC-DC converter by a factor alpha where alpha is less than or equal to one, to obtain a first voltage;

comparing the first voltage with a first threshold, and if the first voltage is greater than or equal to the first threshold switching the DC-DC converter into the inactive duration;

comparing the first voltage with a second threshold and if the first voltage is less than or equal to the second threshold switching the converter into the active duration.

In embodiments of the present invention, the DC-DC converter can be a Buck converter, the continuous mode can be a continuous current mode (CCM) and the discontinuous mode can be a pulse skipping mode (PSM).

The control circuit, the control method, the DC-DC converter and the electronic device according to the embodiments of the present invention at least have one or more of the following advantages.

1. Whether or not to switch the modes is judged according to the parameters of the duration of the DC-DC converter operating in the active duration and the inactive duration, and comparison of the analogue parameters such as voltage and current will be avoided. As a result, the use of analogue comparator is reduced, thus the influence of the semiconductor process on designing the controller can be reduced.

2. In the embodiments of the present invention, when judging whether it needs to switch the modes, the DC-DC converter is controlled to be switched from the discontinuous mode to the continuous mode if $\beta \cdot Na/(Na+Ns)$ is greater than or equal to $\gamma$. This method can ensure that the load regions corresponding to the discontinuous mode and the continuous mode do not overlap with each other, thereby frequent mode switching between the discontinuous mode and the continuous mode in the case of a constant load will be prevented in a reliable and simple manner.

3. In the embodiments of the present invention, when judging whether it needs to switch the modes, the DC-DC converter is switched from the discontinuous mode to the continuous mode if $\beta \cdot Na/(Na+Ns)$ is greater than or equal to $\gamma$. A user can set different thresholds $\gamma$ according to the requirements, so that the DC-DC converter can be adapted to different application scenarios.

What is claimed is:

1. A method for controlling a DC-DC converter operable in a continuous mode and in a discontinuous mode, the discontinuous mode comprising active and inactive durations, the method comprising:

operating the DC-DC converter in the discontinuous mode;

measuring a first duration of an active duration and a second duration of an inactive duration;

judging whether a predefined criterion evaluated using the measured first duration and the measured second duration is satisfied; and switching the DC-DC converter to operate in the continuous mode if the predefined criterion is satisfied, wherein a first switching frequency of charging and discharging the DC-DC converter operating in the continuous mode is different from a second switching frequency of charging and discharging the DC-DC converter during the active duration of the discontinuous mode.

2. The method according to claim 1, wherein the first duration and the second duration are a first and second number of clock periods counted using a same clock signal.

3. The method according to claim 1, wherein the predefined criterion is Na/(Na+Ns) being greater than or equal to a first constant, wherein Na is a number of clock periods of the active duration and Ns is a number of clock periods of the inactive duration.

4. The method according to claim 3, wherein the first constant equals to $\gamma/\beta$, wherein $\gamma$ is a constant greater than 1, $\beta$ is a quotient of the first switching frequency of the DC-DC converter operating in the continuous mode and the second switching frequency of the DC-DC converter during the active duration of the discontinuous mode.

5. The method according to claim 1, wherein operating the DC-DC converter in the discontinuous mode comprises;

multiplying an output voltage of the DC-DC converter by a factor alpha where alpha is less than or equal to one, to obtain a first voltage;

comparing the first voltage with a first threshold, and if the first voltage is greater than or equal to the first threshold switching the DC-DC converter into the inactive duration; and comparing the first voltage with a second threshold which is less than or equal to the first threshold and if the first voltage is less than or equal to the second threshold switching the converter into the active duration.

6. The method according to claim 1, the second switching frequency in the discontinuous mode is less than the first switching frequency in the continuous mode.

7. A DC-DC converter operable in a continuous mode and in a discontinuous mode, the discontinuous mode comprising active and inactive durations, the DC-DC converter comprising:

an input node, an output node, and a first switch, a second switch, an inductor, a capacitor, a control circuit connected between the input node and the output node, wherein the control circuit is configured to:
switch the DC-DC converter between the continuous mode and the discontinuous mode;
switch the DC-DC converter between an active duration and an inactive duration of the discontinuous mode;
measure a first duration of the active duration and a second duration of the inactive duration;
judge whether a predefined criterion evaluated using the measured first duration and the measured second duration is satisfied; and
if the predefined criterion is satisfied, switch the DC-DC converter from the discontinuous mode to the continuous mode,
wherein a first switching frequency of charging and discharging the DC-DC converter operating in the continuous mode is different from a second switching frequency of charging and discharging the DC-DC converter during the active duration of the discontinuous mode.

8. The DC-DC converter according to claim 7, wherein the first duration and the second duration are a first and second number of clock periods counted using a same clock signal.

9. The DC-DC converter according to claim 7, wherein the predefined criterion is Na/(Na+Ns) being greater than or equal to a first constant, wherein Na is a number of clock periods of the active duration and Ns is a number of clock periods of the inactive duration.

10. The DC-DC converter according to claim 9, wherein the first constant equals to γ/β, wherein γ is a constant greater than 1, β is a quotient of the first switching frequency of the DC-DC converter operating in the continuous mode and the second switching frequency of the DC-DC converter during the active duration of the discontinuous mode.

11. The DC-DC converter according to claim 7, further comprising:
a divider connected to the output node for multiplying an output voltage of the DC-DC converter by a factor alpha, where alpha is less than or equal to one, and obtaining a first voltage;
a first comparator having a first input for receiving the first voltage, a second input for receiving a first threshold and an output for outputting a first control signal to the control circuit based on the comparison of the first voltage and the first threshold;
a second comparator having a first input for receiving the first voltage, a second input for receiving a second threshold which is less than or equal to the first threshold and an output for outputting a second control signal to the control circuit based on the comparison of the first voltage and the second threshold;
wherein, the control circuit is further configured to:
switch the DC-DC converter to a next inactive duration if the first voltage is greater than or equal to the first threshold; and
switch the DC-DC converter to a next active duration if the first voltage is less than or equal to the second threshold.

12. The DC-DC converter according to claim 7, further comprising:
a switching period generation circuit for generating a first switching period for the discontinuous mode.

13. The DC-DC converter according to claim 7, wherein the second switching frequency in the discontinuous mode is less than the first switching frequency in the continuous mode.

14. An electronic device, comprising a power source, a load, and the DC-DC converter according to claim 7.

* * * * *